United States Patent [19]

Agostinelli et al.

[11] Patent Number: 4,801,194
[45] Date of Patent: Jan. 31, 1989

[54] MULTIPLEXED ARRAY EXPOSING SYSTEM HAVING EQUI-ANGULAR SCAN EXPOSURE REGIONS

[75] Inventors: John A. Agostinelli, Rochester; José M. Mir, Webster, both of N.Y.

[73] Assignee: Eastman Kodak Company, Rochester, N.Y.

[21] Appl. No.: 100,059

[22] Filed: Sep. 23, 1987

[51] Int. Cl.$^4$ .................... G02F 1/03; G02F 1/01
[52] U.S. Cl. ............................ 350/356; 350/355
[58] Field of Search ............ 350/374, 376, 380, 384, 350/387, 392, 355, 356, 6.5, 6.7, 6.8; 358/213.11, 213.24, 213.15, 213.16, 293

[56] References Cited
U.S. PATENT DOCUMENTS

| | | | |
|---|---|---|---|
| 3,264,611 | 8/1966 | Lohmann | 340/146.3 |
| 4,374,397 | 2/1983 | Mir | 358/75 |
| 4,377,753 | 3/1983 | Mir | 250/578 |
| 4,514,739 | 4/1985 | Johnson et al. | 350/356 |
| 4,667,099 | 5/1987 | Arai et al. | 358/293 |

Primary Examiner—Eugene R. Larche
Assistant Examiner—Nathan W. McCutcheon
Attorney, Agent, or Firm—John D. Husser

[57] ABSTRACT

A construction for reducing image artifacts in electro-optic imaging apparatus of the kind having (i) a linear array of spaced, selectively activatible, light valve elements having generally equal element widths, (ii) an optical system for forming an image of the light valve at a linear image zone and (iii) a mirror for scan-indexing the array image along said image zone. The spacings between array elements increase progressively from the center to the ends of the array to obviate under or over scan of adjacent image regions.

4 Claims, 3 Drawing Sheets

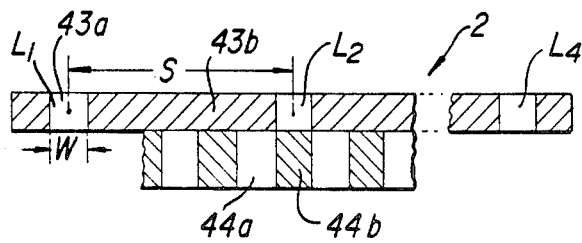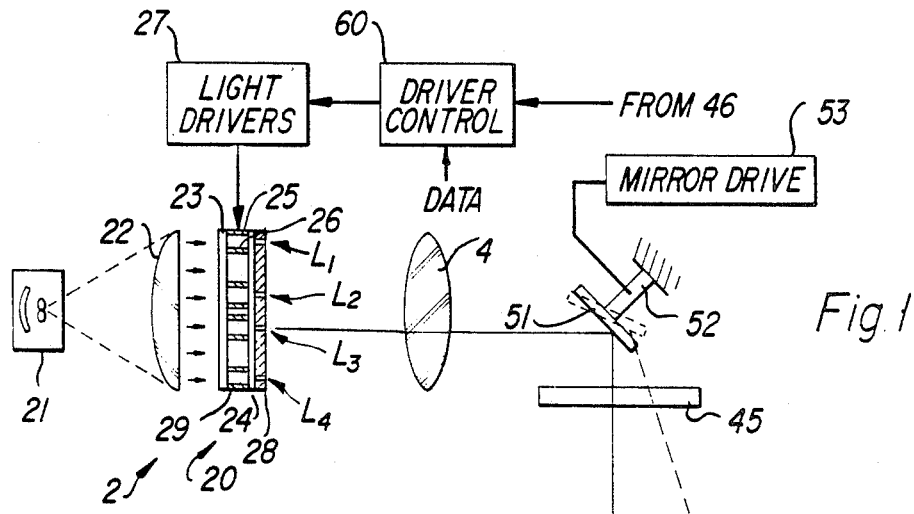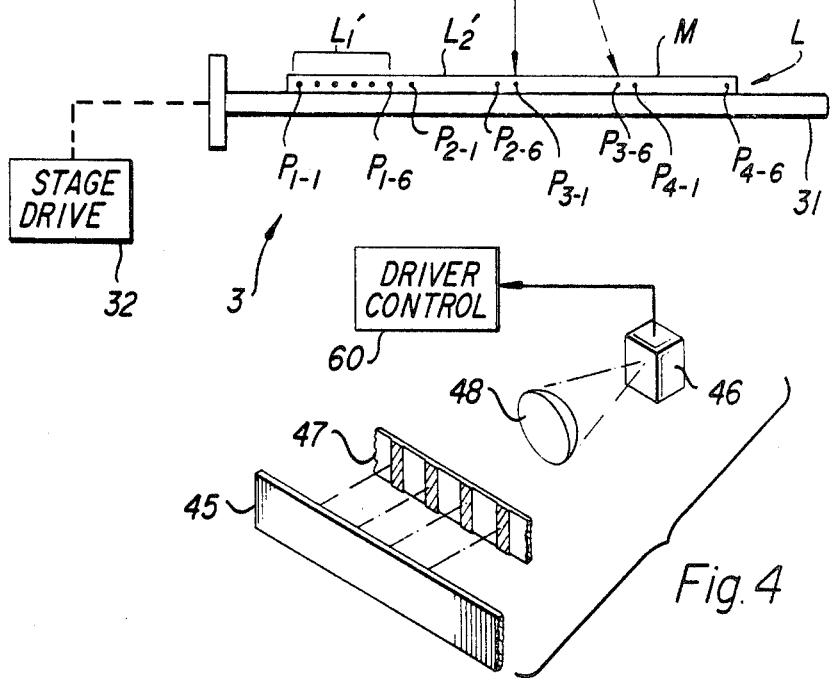

MULTIPLEXED ARRAY EXPOSING SYSTEM HAVING EQUI-ANGULAR SCAN EXPOSURE REGIONS

Field of the Invention

The present invention relates to electro-optic imaging, e.g. with an exposing source array of light-valving or light-emitting devices, and more particularly to improvements in systems which employ such arrays in a multiplexing exposure scan.

BACKGROUND OF THE INVENTION

U.S. patent application Ser. No. 099,953, entitled "System for High Resolution Exposure Address With Coarser Resolution Exposing Array", filed Sept. 23, 1987, by Agostinelli and Mir, describes advantageous imaging devices wherein an object source array (e.g. comprising a linear array of light valve elements) of relatively coarse resolution is imaged at a print zone in a manner providing a relatively higher resolution exposure. In one preferred embodiment, this approach utilizes (i) an object array having exposing pixels of width (W) located with intervening non-exposing spaces so as to have a center-to-center spacing S and (ii) a scan multiplexing optical system, e.g. including lens means and a mirror, which indexes the image of the exposing array in a number of increments, approximately $S \div W$, to successive positions across a linear print zone. This system offers important advantages in simplifying array fabrication and in reducing electronic complexities.

The specific embodiments of the general multiplex approach that is described in the above-referenced application operate well in many exposing systems; however, we have found image artifacts to occur in certain systems employing that general approach. For example where the length of the exposing array is relatively large as a proportion of the array to scan mirror distance, undesirable exposure inaccuracies are visible at scan regions located near the ends of the linear scan zone.

SUMMARY OF THE INVENTION

One significant purpose of the present invention is to provide for electro-optic imaging systems, of the kind employing the general concepts of the above-referenced application, improved embodiments that obviate image artifacts such as the above-noted end-zones exposure inaccuracies. Thus, one important advantage of the present invention is an improvement in quality for images produced by long array embodiments of the Agostinelli and Mir multiplex exposure approach.

In one aspect the present invention constitutes an improvement for electro-optic imaging apparatus of the kind having (i) a linear light source array comprising a plurality of selectively activatible pixel source portions having approximately equal linear widths with generally equal spaces therebetween, (ii) lens means for forming an image of the pixel source portions at a linear image zone and (iii) multiplexing means for scan-indexing the array image along the image zone in a plurality of increments. This improvement employs an array construction wherein the spaces between the array pixel sources increase in linear dimension progressively from the center to the ends of the array. In one preferred embodiment, the spacings between array pixel source portions are such that the angle subtended by each, relative to the scan center of the multiplexing means, is approximately equal.

BRIEF DESCRIPTION OF THE DRAWINGS

The subsequent description of preferred embodiments refers to the attached drawings wherein:

FIG. 1 is a schematic illustration of one preferred exposing system in accord with the present invention;

FIG. 3 is a diagram showing size and space relations of the FIG. 2 light valve array;

FIG. 4 is a schematic perspective view further illustrating other portions of the FIG. 1 system.

DETAILED DESCRIPTION OF THE PREFERRED EMBODIMENTS

Figure 2:
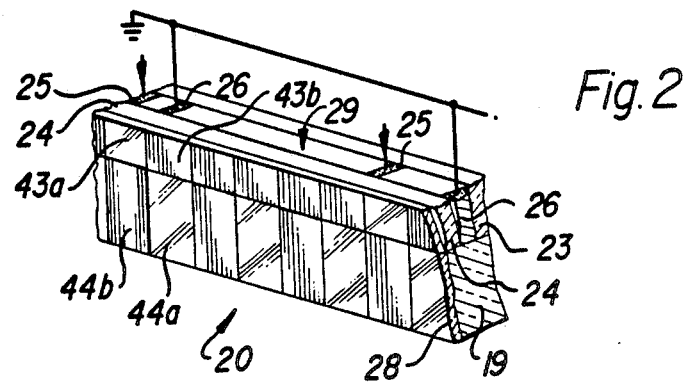
FIG. 2 is a perspective view of a portion of a light valve array constructed to function in the FIG. 1 embodiment of the present invention.

The multiplexing printer embodiment shown in FIG. 1 comprises, in general, an object array sub-system 2 providing a plurality of selectively activatible exposure elements, a print station 3 constructed and located to transport successive line portions of print medium M to and through a print zone L, lens means (represented by lens 4) that is constructed and located to form an image of the object array 2 at the print zone (at a selected magnification F, e.g. 1:1, 2:1, 1:2, etc.) and a scan sub-system 5 that is constructed and located to index the light image of object array sub-system 2 to different locations at the print zone L.

The object array sub-system 2 includes a light source 21 providing uniform illumination to a collimator lens 22, which in turn directs collimated light onto the ingress polarizer element 23 of light valve array 20. The light valve array 20, shown in more detail in FIG. 2, also comprises an electro-optic panel 29, which is sandwiched between ingress polarizer 23 and egress polarizer 24. The panel 29 is formed to have a plurality of discrete exposure portions by construction of spaced electrode structures 25, 26 in a manner which enables selective application of an electrical field in a direction transverse to the direction of light passing through the panel. Such light valve structures are known in the art, e.g. see U.S. Pat. Nos. 4,371,892 and 4,569,573. In general, such arrays function with the directions of the polarizers 23, 24 at 90° relative to each other, and the electro-optical panel 29 (e.g. formed of PLZT material) is adapted to change the polarization direction of passing light by 90° when an activating electric field is applied across the electrodes. Usually one electrode of each pixel portion pair is at a reference electrode 25, e.g. at ground potential, and the other is an address electrode, selectively energizable by driver circuits 27. Thus when the energizable electrode 25 is energized, the field between it and reference electrode 26 will cause the electro-optic material therebetween to change the direction of polarized light from ingress polarizer 23 by 90°; therefore such modulated light will pass through egress polarizer 24. When the address electrode 25 of an array pixel portion is not energized, there will be no change in the polarization of light passing that modulator panel portion and such light will be blocked by the egress polarizer. In the FIGS. 1 and 2 embodiment a mask layer 28 is provided, e.g. formed on egress polarizer 24, and comprises light transparent portions 43a, aligned between electrode pairs, and light opaque portions 43b, interspaced between those transparent portions. In another preferred embodiment (not shown), the msak layer 28 is formed directly on the egress surface of the modulator panel 29, which obivates alignment problems.

While the embodiments of the present invention employ illuminated PLZT type light valve arrays as the object sources for selectively activatible exposures, one skilled in the art will appreciate that other light exposure means, e.g. light emitting diode arrays or illuminated liquid crystal light valve arrays can also be utilized. Similarly, while the preferred embodiment of the present invention employs a mirror 51 mounted on a bimorph bender element 52 to controllably index the light image from the object array 2, other galvo-mirror systems and image scanner systems, e.g., rotating polygon mirrors, can be utilized.

As shown in FIG. 1, the bimorph bender element 52 is controllably driven by mirror drive circuit 53 to move mirror 51 between the solid and dotted line position shown (in successive increments, or in a continuous pass), so as to index the image of the masked face of light valve array at different locations on the line of record medium M (e.g. photosensitivie film or paper) then present at the image zone of station 3. As illustrated, the station 3 can comprise a translatory stage 31 driven by stage drive 32 to shift successive line portions of the supported image medium into alignment at print zone L with the line image from lens system 4 and mirror 51. Although the image of light valve array is magnified at the print station 3 in FIG. 1, it will be appreciated that such image can be at unit magnification or less, as the application requires.

Referring now to FIG. 3, as well as FIG. 1, it can be seen that the object source 2, constructed according to the approach of the above cited Agostinelli and Mir application includes exposing elements $L_1$–$L_4$ having a predetermined width (W) in the direction of array length. Also, the individual elements are spaced along the length direction with center-to-center spacing (S) and have intermeidate opaque sections 43b formed by portions of mask 28.

With a system constructed as described above, the mirror drive circuit 53 and driver control circuit 60 can be coordinated to effect a line exposusre in accordance with the present invention. Thus the circuits operate so that exposing source $L_1$ will sequentially address pixel portions $P_{1-1}$ to $P_{1-6}$ at the print zone, source $L_2$ will sequentially address pixel portions $P_{2-1}$ to $P_{2-6}$ at the print zone, source $L_3$ will sequentially address pixel portions $P_{3-1}$ to $P_{3-6}$ at the print zone and source $L_4$ will sequentially address pixel portions $P_{4-1}$ to $P_{4-6}$ at the print zone. This general procedure can be effected in various ways; however, two main features are important. First, the number (M) of sequential exposing actuations to be effected with each light source is selected based on the ratio $(S \div W) \cdot X$ of the exposing element spacing, along the length of the array, to the exposing element width in the direction of the array length, where X is the number of different color exposures per pixel to be effected at the print zone. In the monochrome ($X=1$) exposing system discussed thus far with respect to FIGS. 1–3, the $S \div W$ ratio is 6, and the discrete locations available for address, e.g. by the source $L_1$, therefore comprise the six pixel portions $P_{1-1}$ to $P_{1-6}$. If desired, the $S \div W$ ratio can differ slightly from the integer number of multiplexed printing sequences performed at the linear image zone. For example, if it is preferred to provide a slight overlap of exposed pixel portions, the $S \div W$ ratio can be somewhat more than the number of multiplexing exposure sequences (M). If a slight spacing is desired between addressed pixel portions, $S \div W$ can be slightly greater than the number of addressed pixel portions. The selection of a preferred $S \div W$ ratio will depend to some extent on the resolution of the optical system. For good results the indexing should be such that the overlap or spacing between pixels as exposed at the print zone not differ by more than about 50% from the condition of edge-to-edge abutment.

Considering the foregoing it can be seen that a second main feature of general procedures according to the present invention is to predeterminedly synchronize the movement of mirror 51 with the light drivers circuit 27. Thus, it is important that, in each sector $L'_1$, $L'_2$, etc., the addressed pixel portions (e.g. $P_{1-1}$ to $P_{1-6}$) of the sector are uniformly spaced along the sector length. Conceptually the aim is to actuate the light sources at increments of image movement at the image zone of about the exposing element width (W) times the system magnification factor (F).

FIGS. 1–4 illustrate one preferred approach for implementing such control in accord with the invention. As best shown in FIGS. 2 and 3, mask 28 also comprises a plurality of alternating opaque and transparent portions 44a and 44b having a spatial frequency equal to $1 \div W$. In order to allow light from source 21 to pass through grating portions 44a, the support 19 adjacent that grating is transparent. If desired, the support could be omitted or the support could be an electro-optic polarizer sandwich with electrodes energized to a light-transmitting condition.

Referring to FIGS. 1 and 4, it can be seen that a mirror 45 is located along the edge of the optical path of the light passing from source 21 through the grating 44a, 44b of mask 28 so as to direct this light to a photodetector 46 via a grating 47 and lens 48. The grating 47 is constructed to have the same spatial frequency as grating 44a, 44b of mask 28, as imaged at the exposure zone L. That is the grating 47 has a spatial frequency of $F \cdot (1 \div W)$ where F is the system magnification. This cooperative grating system produces a high contrast Moiré pattern; and, as the mirror 51 scans, the light transmitted through grating 47 produces a sinusoidal voltage output signal from photodetector. Thus, each voltage maximum (or minimum) of the photodetector signal will correspond to a multiplex event, i.e. a signal for actuating driver control circuit 60 to gate printing information to the light valve drivers. This synchronization technique is highly useful in avoiding nonuniformities caused by flutter in the bimorph driven mirror. While, the optical grating position synchronization system just described is advantageous, other position detection systems, e.g. shaft encoders or drive signal counters, can be used to perform the requisite functions of synchronization. In certain embodiments of the FIG. 4 system lens 48 is not needed.

In operation, print data is input to the driver control (which can be a portion of a microprocessor unit) from a buffer memory where it is stored in a format suitable to load the drivers for sources $L_1$ to $L_4$ with print/no-print information for each of their respective sectors of image pixel portions. That is, at the first stage of the line exposure sequence, the gates to the drivers for sources $L_1$ to $L_4$ are loaded in parallel with data respectively for pixel portions $P_{1-1}$, $P_{2-1}$, $P_{3-1}$ and $P_{4-1}$. At the appropriate sequence signal from detector 46 (indicating that mirror 51 is in the position to address those pixel portions), the gates are signalled to operate drivers for sources $L_1$–$L_4$ in accordance with loaded print/no print data and light is directed to the pixel portions accordingly. Thereafter, data for positions $P_{1-2}$, $P_{2-2}$, $P_{3-2}$ and $P_{4-2}$ are loaded into the gates and await the signal from driver control that mirror 51 has moved to the next appropriate pixel address location. This sequence progresses until each sector has all pixel portions address and stage drive then advances the print stage while mirror 51 returns to the initial position. One skilled in the art will appreciate that a multi-level gray scale imaging of pixels can be achieved using techniques such as described in U.S. Pat. Nos. 4,378,568 or 4,449,153 in conjunction with the present invention.

Figure 5:
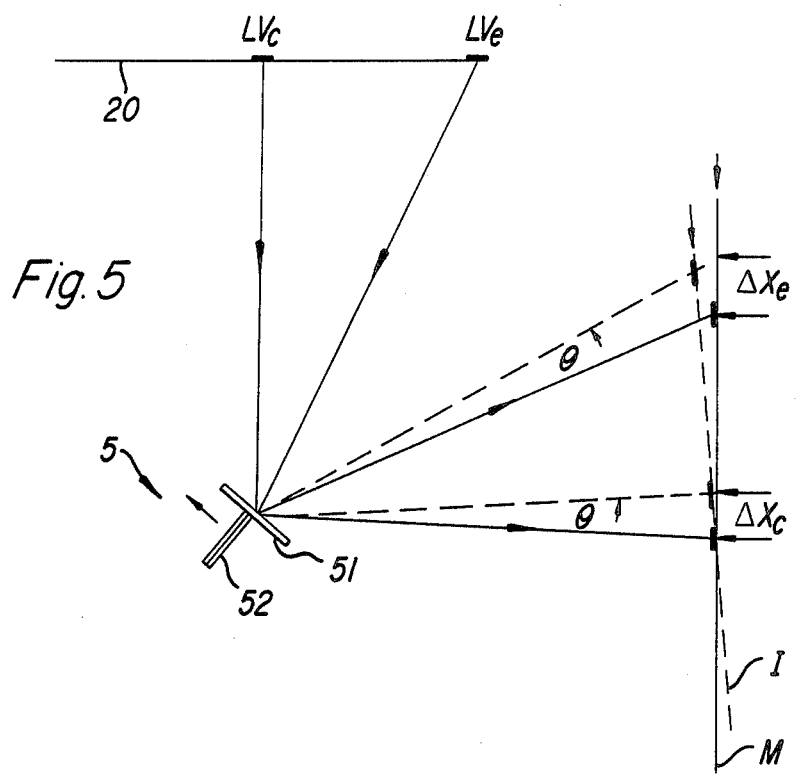
FIGS. 5 and 6 are diagrams useful in explaining the problem and solution according to the present invention.

An ideal optical multiplexer should cause only a linear translation of the light source array at the image plane. However, we have found that the system, as described thus far, can, in some instances, introduce the undesirable artifact shown in FIG. 5. This effect may be illustrated by considering how two light valve elements of array 20, one $LV_c$ at the center and one $LV_e$ at the edge of the field, are displaced when their image is scanned through angle $\theta$ by the bimorph system 5. The array image is initially assumed to coincide with the exposure plane, defined by a sheet of photosensitive material M. When the array is scanned through angle $\theta$ by rotation of mirror 51, the image plane I is tilted at the same angle with respect to the exposure plane M. In most practical multiplex configurations, the maximum deviation normal to the exposure plane M is a fraction of a millimeter and does not result in noticeable defocus, due to the large depth of field of the optical system. The more serious problem, however, is the difference in scan distance ($\Delta X_c < X_e$) between the edge and center modulators $LV_c$ and $LV_e$. If the scan by mirror 51 is adjusted such that the scan regions of the more central light valves abut perfectly with their neighbors, the end region light valves will be overscanned, i.e. have regions of overlap. The effect can be quite noticeable if the overscanning produces exposure variations close to a highly visual spatial frequency.

Figure 6:
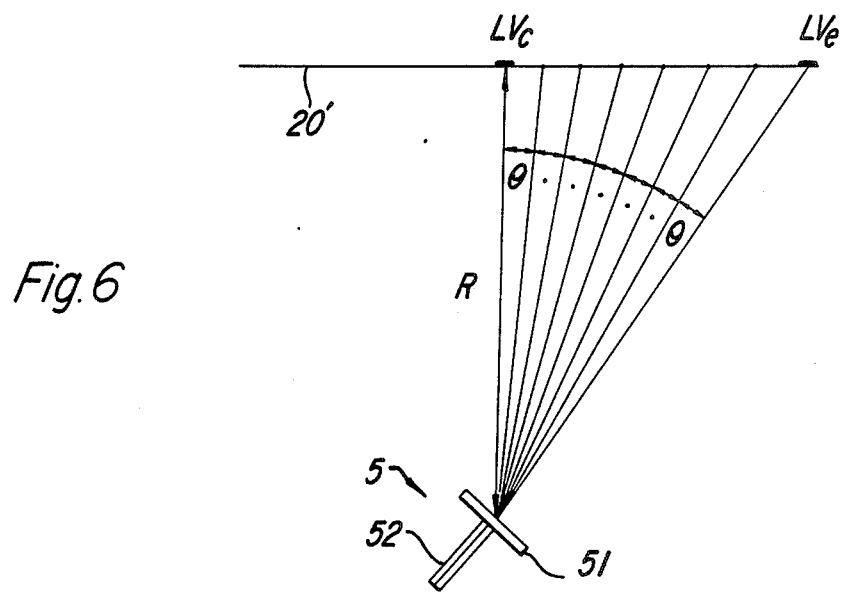

FIG. 6 shows how array design in accord with the present invention compensates for this scanning artifact. Thus, when the light valve elements of array 20' are spaced such that the angle $\theta$ subtended between the centers of each pair of adjacent light valves, relative to the scan center of the mirror 51, is equal, an angular rotation $\theta$ will cause all pixels exposed at the image zone M (in reality I) to properly abut with their neighbors. The distance D of the center of any light valve element from the center of element $LV_c$ is therefore defined by, $$D_y = R \tan(\theta \cdot y),$$

where $\theta$ represents the value of the equal angles between adjacent light valves, R is the bimorph to array center distance and y is the number of the light valve element from the center element $LV_c$ (see FIG. 6). Although such a variable pitch array will, to some extent stretch the image towards the edge of the field, the effect is small and not visually objectionable in the same degree as the overlap artifact.

As noted previously, light valve position design in accord with the present invention is not always desirable, especially in cases where the array size is much smaller than its distance to the bimorph. However, consider, for example, an embodiment having a 90 mm long, 256 light valve array, with R=200 mm. In that example a 5% overscan results at the edge of the field. Since this result would be quite objectionable, a modified array structure is highly useful.

The invention has been described in detail with particular reference to preferred embodiments thereof, but it will be understood that variations and modifications can be effected within the spirit and scope of the invention.

We claim:

1. An electro-optic imaging apparatus comprising: (i) a linear light source array comprising a plurality of selectively activatible pixel source portions having approximately equal widths, in the linear direction of the array, (ii) lens means for forming an image of said pixel source portions at a linear image zone and (iii) multiplexing means for scan-indexing the array image along said image zone in a plurality of increments, said light source array being constructed so that the spaces between said array pixel sources increase in linear dimension progressively from the center to the ends of said array.

2. The invention defined in claim 1 wherein the spacings between array pixel source portions are such that the angle subtended by each, relative to the scan center of said multiplexing means, is approximately equal.

3. An electro-optic imaging apparatus comprising: (i) a linear array of spaced, selectively activatible, light valve elements having generally equal element widths, (ii) means for forming an image of said light valve at a linear image zone and (iii) mirror means for scan-indexing the array image along said image zone, said array of light valve elements being constructed so that the spaces between said elements increase progressively from the center to the ends of said array.

4. The invention defined in claim 3 wherein the spacings between elements are such that the angle subtended by each spacing, relative to the scan center of said mirror means, is approximately equal.

* * * * *